US012670262B2

(12) United States Patent
Zhang et al.

(10) Patent No.: US 12,670,262 B2
(45) Date of Patent: Jun. 30, 2026

(54) SECURITY VULNERABILITY ANALYSIS OF CODE BASED ON MACHINE LEARNING AND VARIABLE USAGE

(71) Applicant: International Business Machines Corporation, Armonk, NY (US)

(72) Inventors: Li Bo Zhang, Beijing (CN); Zhuo Zhao, Beijing (CN); Ming Qian Wang, Beijing (CN); Jia Ning Li, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 18/356,276

(22) Filed: Jul. 21, 2023

(65) Prior Publication Data

US 2025/0028840 A1    Jan. 23, 2025

(51) Int. Cl.
G06F 21/57 (2013.01)
(52) U.S. Cl.
CPC ...... G06F 21/577 (2013.01); G06F 2221/033 (2013.01)
(58) Field of Classification Search
CPC .......................... G06F 21/577; G06F 2221/033
See application file for complete search history.

(56) References Cited

U.S. PATENT DOCUMENTS

| | | |
|---|---|---|
| 9,361,077 B1 | 6/2016 | Hale et al. |
| 9,836,301 B2 | 12/2017 | Misra et al. |
| 10,157,045 B2 | 12/2018 | Venkataramani et al. |
| 10,203,968 B1 | 2/2019 | Lawson |
| 10,817,604 B1 | 10/2020 | Kimball et al. |
| 11,544,379 B2 * | 1/2023 | Sandoval ................ G06F 21/52 |
| 11,568,057 B2 | 1/2023 | Handurukande et al. |
| 2019/0324731 A1 * | 10/2019 | Zhou ....................... G06F 8/427 |

(Continued)

FOREIGN PATENT DOCUMENTS

| | | |
|---|---|---|
| CN | 112148602 A | 12/2020 |
| CN | 115510449 A | 12/2022 |
| KR | 102528849 B1 | 5/2023 |

OTHER PUBLICATIONS

Zhang Chen K-means Clustering Algorithm with improved Initial Center (Year: 2009).*

(Continued)

*Primary Examiner* — Linglan Edwards
*Assistant Examiner* — Jacob Benedict Knackstedt
(74) *Attorney, Agent, or Firm* — Harrity & Harrity, LLP

(57)    ABSTRACT

According to a present invention embodiment, software is analyzed for security vulnerabilities. Information from a security scan of code is analyzed to identify a security issue pertaining to a code portion. A machine learning model determines an initial risk factor score for the security issue based on a history of information pertaining to one or more prior security scans. The initial risk factor score is refined to produce an overall risk factor score for the security issue based on a confidence of the initial risk factor score. The initial risk factor score is refined based on one or more risk factor scores for operations within the code applied to a variable of the code portion. A classification of the security issue is determined as one of a valid security issue and a false positive based on the overall risk factor score.

20 Claims, 11 Drawing Sheets

(56)    References Cited

U.S. PATENT DOCUMENTS

| | | | |
|---|---|---|---|
| 2020/0401702 A1 | 12/2020 | Karabatis et al. | |
| 2021/0034753 A1 | 2/2021 | Canada et al. | |
| 2022/0108010 A1 | 4/2022 | Bishop, III et al. | |
| 2024/0250979 A1* | 7/2024 | Ding | H04L 63/1433 |
| 2024/0330473 A1* | 10/2024 | Srivastava | G06F 21/577 |
| 2025/0023885 A1* | 1/2025 | Sinks | H04L 63/1416 |
| 2025/0036777 A1* | 1/2025 | Cameron | G06F 21/577 |

OTHER PUBLICATIONS

Xin Li, et al., "Automated Software Vulnerability Detection Based on Hybrid Neural Network", Appl. Sci. 2021, 11, 3201, https://www.mdpi.com/2076-3417/11/7/3201, Apr. 2, 2021, 16 pages.

Hazim Hanif, et al., "VulBERTa: Simplified Source Code Pre-Training for Vulnerability Detection", conference paper at IJCNN 2022, https://arxiv.org/pdf/2205.12424.pdf, May 25, 2022, 8 pages.

* cited by examiner

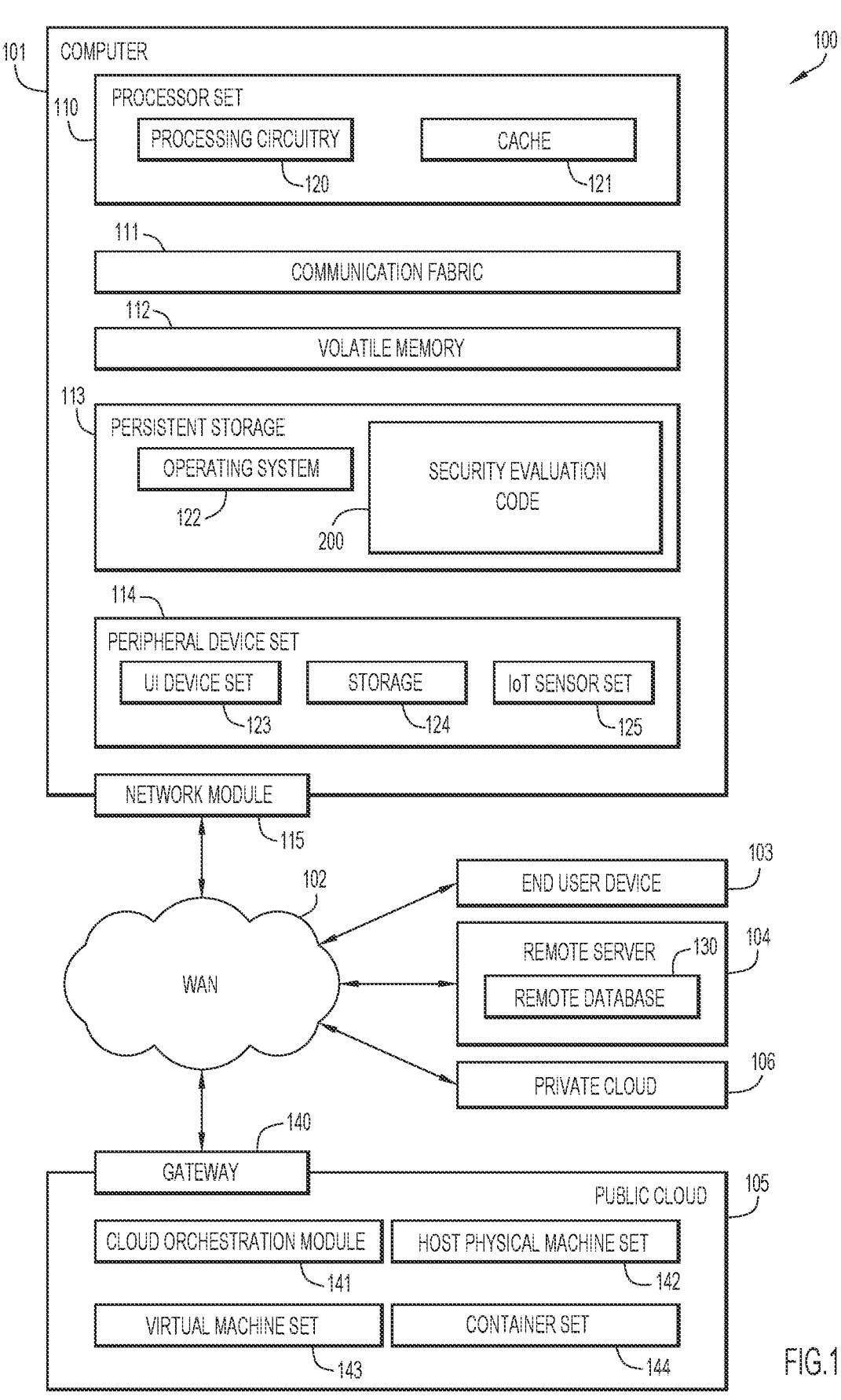

COMPUTER 101

100

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

SECURITY EVALUATION CODE 200

PERIPHERAL DEVICE SET 114

UI DEVICE SET 123

STORAGE 124

IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

FIG.1

| RISK | ISSUE DESCRIPTION | FILE | CODES | EXPLANATION | RISK SCORE |
|---|---|---|---|---|---|
| RISK IDENTIFIER/ DESCRIPTION | DESCRIPTION | PATH/ NAME | CODE STATEMENT | EXPLANATION | VALUE/ TYPE |
| RISK IDENTIFIER/ DESCRIPTION | DESCRIPTION | PATH/ NAME | CODE STATEMENT | EXPLANATION | VALUE/ TYPE |

Figure 5:
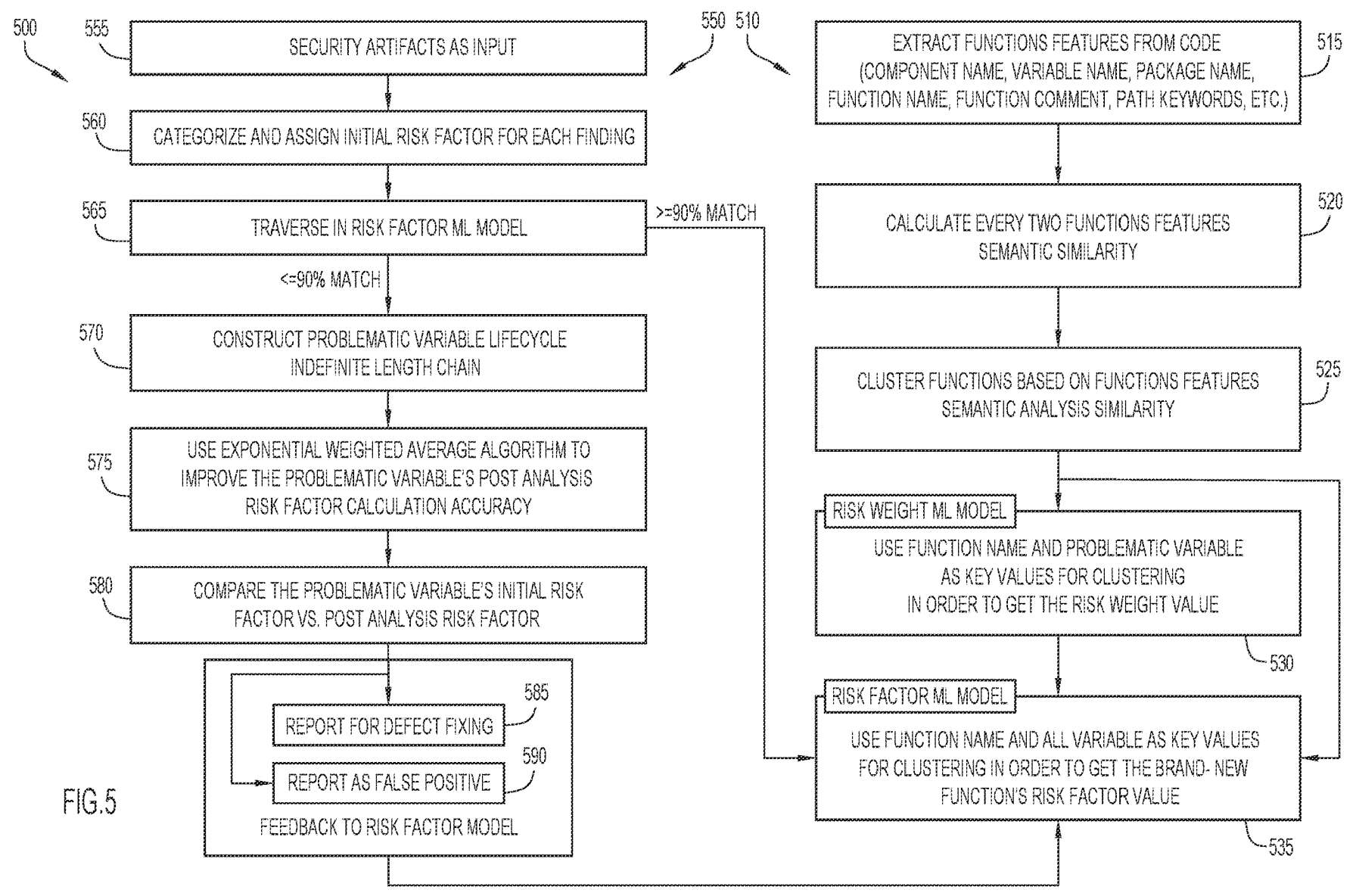

515 EXTRACT FUNCTIONS FEATURES FROM CODE (COMPONENT NAME, VARIABLE NAME, PACKAGE NAME, FUNCTION NAME, FUNCTION COMMENT, PATH KEYWORDS, ETC.)

520 CALCULATE EVERY TWO FUNCTIONS FEATURES SEMANTIC SIMILARITY

525 CLUSTER FUNCTIONS BASED ON FUNCTIONS FEATURES SEMANTIC ANALYSIS SIMILARITY

530 RISK WEIGHT ML MODEL — USE FUNCTION NAME AND PROBLEMATIC VARIABLE AS KEY VALUES FOR CLUSTERING IN ORDER TO GET THE RISK WEIGHT VALUE

535 RISK FACTOR ML MODEL — USE FUNCTION NAME AND ALL VARIABLE AS KEY VALUES FOR CLUSTERING IN ORDER TO GET THE BRAND-NEW FUNCTIONS RISK FACTOR VALUE 550 510

555 SECURITY ARTIFACTS AS INPUT

560 CATEGORIZE AND ASSIGN INITIAL RISK FACTOR FOR EACH FINDING

565 TRAVERSE IN RISK FACTOR ML MODEL

<=90% MATCH

>=90% MATCH

570 CONSTRUCT PROBLEMATIC VARIABLE LIFECYCLE INDEFINITE LENGTH CHAIN

575 USE EXPONENTIAL WEIGHTED AVERAGE ALGORITHM TO IMPROVE THE PROBLEMATIC VARIABLE'S POST ANALYSIS RISK FACTOR CALCULATION ACCURACY

580 COMPARE THE PROBLEMATIC VARIABLE'S INITIAL RISK FACTOR VS. POST ANALYSIS RISK FACTOR

585 REPORT FOR DEFECT FIXING

590 REPORT AS FALSE POSITIVE — FEEDBACK TO RISK FACTOR MODEL

500

$v_n$ - VARIABLE CONTAINED IN VULNERABLE CODE $f_n$ - THE FUNCTION THAT $v_0$ EXPERIENCED

R - RISK FACTOR (CORRESPOND TO RISK SCORE IN RISK DATA MODEL)

S - AVERAGE RISK SCORES OF THE NUMBER OF $1 - \frac{1}{\beta}$ FUNCTIONS $\beta$ - ADJUSTABLE HYPERPARAMETERS, $\beta = 1 - \frac{1}{N}$, e.g., $N = 4$, $\beta = 0.75$

SECURITY VULNERABILITY ANALYSIS OF CODE BASED ON MACHINE LEARNING AND VARIABLE USAGE

BACKGROUND

1. Technical Field

Present invention embodiments relate to computer security, and more specifically, to determining a vulnerability level of software or code by machine learning models and analysis of code hierarchy and variable lifecycle chains.

2. Discussion of the Related Art

A security scan protects software or code privacy by checking for potential vulnerability within the code. However, security scans are not sufficiently precise and usually generate a significant number of false positives. When performing a software scan (e.g., project static code scan, dynamic scan, open-source scan, security quality assurance (QA), penetration testing, etc.), hundreds or thousands of security issues may need to be assessed. Accordingly, security engineers or developers typically assess the numerous security issues from a scan report to distinguish valid issues from false positives. This analysis requires significant amounts of time for meetings to understand deep code hierarchy, logic, and security domain knowledge, to identify the valid issues, and to explain the false positives. In addition, details for findings of the numerous security issues need to be summarized.

SUMMARY

According to one embodiment of the present invention, a system for analyzing software for security vulnerabilities comprises one or more memories and at least one processor coupled to the one or more memories. The system analyzes information from a security scan of code to identify a security issue pertaining to a code portion. A machine learning model determines an initial risk factor score for the security issue based on a history of information pertaining to one or more prior security scans. The initial risk factor score is refined to produce an overall risk factor score for the security issue based on a confidence of the initial risk factor score. The initial risk factor score is refined based on one or more risk factor scores for operations within the code applied to a variable of the code portion. A classification of the security issue is determined as one of a valid security issue and a false positive based on the overall risk factor score. Embodiments of the present invention further include a method and computer program product for analyzing software for security vulnerabilities in substantially the same manner described above.

BRIEF DESCRIPTION OF THE DRAWINGS

Generally, like reference numerals in the various figures are utilized to designate like components.

FIG. 1 is a diagrammatic illustration of an example computing environment according to an embodiment of the present invention.

FIG. 3 is schematic illustration of a risk data model according to an embodiment of the present invention.

FIG. 5 is a procedural flowchart of a manner of analyzing code for security vulnerability based on machine learning models according to an embodiment of the present invention.

DETAILED DESCRIPTION

Figure 2:
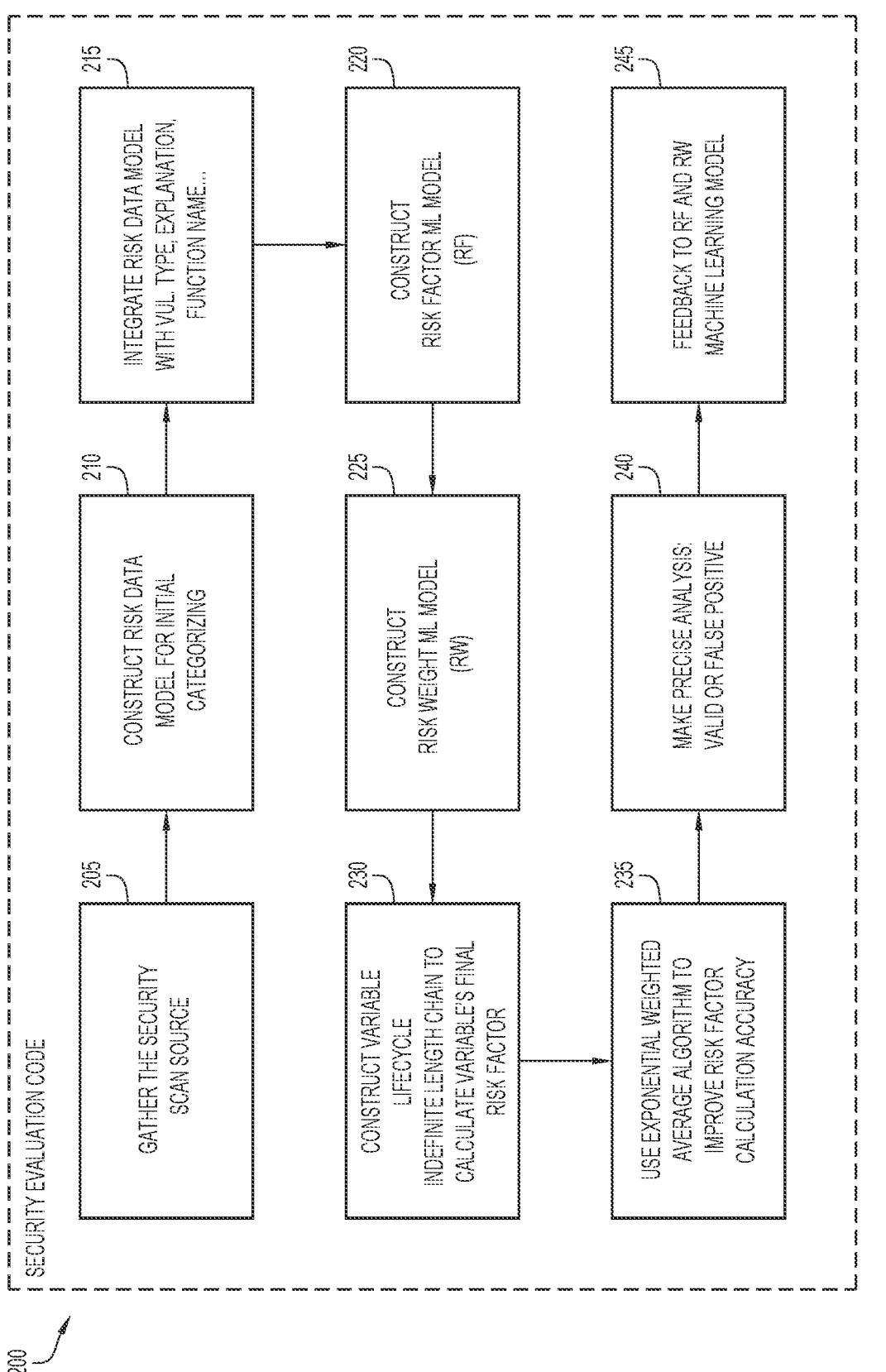
FIG. 2 is a flow diagram of a manner of analyzing code for security vulnerability according to an embodiment of the present invention.

An embodiment of the present invention enables analysis of security scan reports efficiently and assists in identifying a true positive security issue. The present invention embodiment generates a risk factor score to define a vulnerability level by analyzing code hierarchy and variable lifecycle chains and employing machine learning models to process this complex work.

An embodiment of the present invention utilizes code hierarchy, variable lifecycle chains, and semantic similarity analysis of function attributes to provide a precise security vulnerability analysis based on machine learning models. A security scan information source is generated from various repositories, artifacts, and channels. A risk data model is constructed to store, and perform initial categorization of, a history of security data (e.g., vulnerability type, explanation, package name, and function features or attributes (e.g., function name, variables, comments, paths, file name, etc.)). The risk data model stores security data, including extracted valid data from a scan history including a significant number of scan reports, and an initialized risk score for each category of scan findings. The risk data model provides a basis for comparison of newly scanned issues.

A risk factor machine learning model is constructed based on the risk data model to produce a risk factor score for a problematic variable (e.g., a variable residing within code that is vulnerable or has a potential security issue, etc.). The risk factor machine learning model is used to produce to a risk factor score by clustering based on a key including a function name and all variables. A risk weight machine learning model is also constructed based on the risk data model to produce a risk weight value for a problematic variable (e.g., a variable residing within code that is vulnerable or has a potential security issue, etc.). The risk weight machine learning model is used to produce the risk weight value by clustering based on a key including a function name and the problematic variable. These models categorize security findings at the variable level.

A lifecycle chain of the problematic variable is constructed and utilized to calculate a final or overall risk factor score for the problematic variable. An exponential weighted average technique or algorithm is employed to improve the risk factor score accuracy. The lifecycle chain tracks a hierarchical structure of the code and uses the exponential weighted average technique to determine the final risk factor score. The final risk factor score is based on prior risk factor scores. This approach considers a depth impact of variables in a lifecycle chain since a variable may be exposed to different potential risks in different portions of a code hierarchy.

A precise analysis may be performed based on the machine learning models and variable lifecycle chain to render a determination with respect to the problematic variable being a valid security issue or a false positive. The determination is fed back to the risk factor and risk weight machine learning models for continuous re-training to improve results.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code involved in performing the inventive methods, such as security evaluation code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI)

device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A method of analyzing code for security vulnerability (e.g., via security evaluation code 200 and computer 101, etc.) according to an embodiment of the present invention is illustrated in FIG. 2. Security evaluation code 200 generates a security scan information source from various repositories, artifacts, and channels at operation 205 (e.g., security issue comments in a forum or tool, security issue explanations in a forum or tool, file annotations, security scan reports, communications (e.g., communication platform messages, electronic mail, etc.), etc.). The security scan information source may include information from results or reports of various security scans (e.g., dynamic, open-source, security quality assurance (QA), penetration testing, etc.) of software or code (e.g., on-premise code, distributed or cloud applications, etc.).

Security evaluation code 200 generates or constructs a risk data model at operation 210. The risk data model is constructed to store, and perform initial categorization of, a history of security data (e.g., risk or risk identifier, issue description, etc.). The risk data model is integrated with additional information at operation 215. The additional information may include vulnerability type, risk score/type, explanation of risk score type, function attributes (e.g., function name, variables, comments, paths, file name, etc.), etc. The risk data model stores security data, including extracted valid data from a history including a significant number of software or code scan reports, and an initialized risk score for each category of scan findings. The risk data model provides a basis for comparison of newly scanned issues.

A risk data model 300 is illustrated, by way of example only, in FIG. 3. Risk data model 300 is shown in the form of a table with columns or fields for indicating a risk, issue description, file, codes (raising the issue), a risk score and/or type, and an explanation of the risk score and/or type. Risk field 305 indicates an identified risk. This may be accomplished by providing a description of the risk and/or an identifier (e.g., common weakness enumeration (CWE) identification and/or description, etc.). Issue description field 310 provides a description of the issue, while file field 315 indicates a path and/or file name for the file containing the code. Codes field 320 indicates the code statement containing the issue. Risk score field 330 provides a risk score and/or type (e.g., true or false positive, etc.) for the security issue, and explanation field 325 provides an explanation for the risk score and/or type (e.g., explanation of a false positive, etc.).

The information for the risk, issue description, file, and codes fields of the risk data model may be generated using any conventional or other natural language processing (NLP) techniques (e.g., entity recognition, relationship discovery, semantic analysis, sentiment analysis, part-of-speech (POS) tagging, etc.) to extract the information from the security information source. The risk score and explanation may be provided by a user based on analysis of the security issue. Alternatively, the information for these fields may be generated using any conventional or other natural language processing (NLP) techniques (e.g., entity recognition, relationship discovery, semantic analysis, sentiment analysis, part-of-speech (POS) tagging, etc.) to extract the information from the security scan information source.

Referring back to FIG. 2, once the risk data model is integrated with the additional information, security evaluation code 200 generates a risk factor machine learning model based on the risk data model at operation 220. The risk factor machine learning model analyzes a risk factor for a problematic variable (e.g., a variable residing within code that is vulnerable or has a potential security issue, etc.), and produces a risk factor score by clustering based on a key including a function name and all function variables. The risk factor score indicates a risk factor for the function based on corresponding variables. Security evaluation code 200 also generates a risk weight machine learning model based on the risk data model at operation 225. The risk weight machine learning model analyzes a risk weight for a problematic variable (e.g., a variable residing within code that is vulnerable or has a potential security issue, etc.), and produces a risk weight value by clustering based on a key including a function name and a problematic variable. The risk weight value indicates a risk for a function with respect to the problematic variable. These machine learning models categorize security findings at the variable level.

Figure 4:
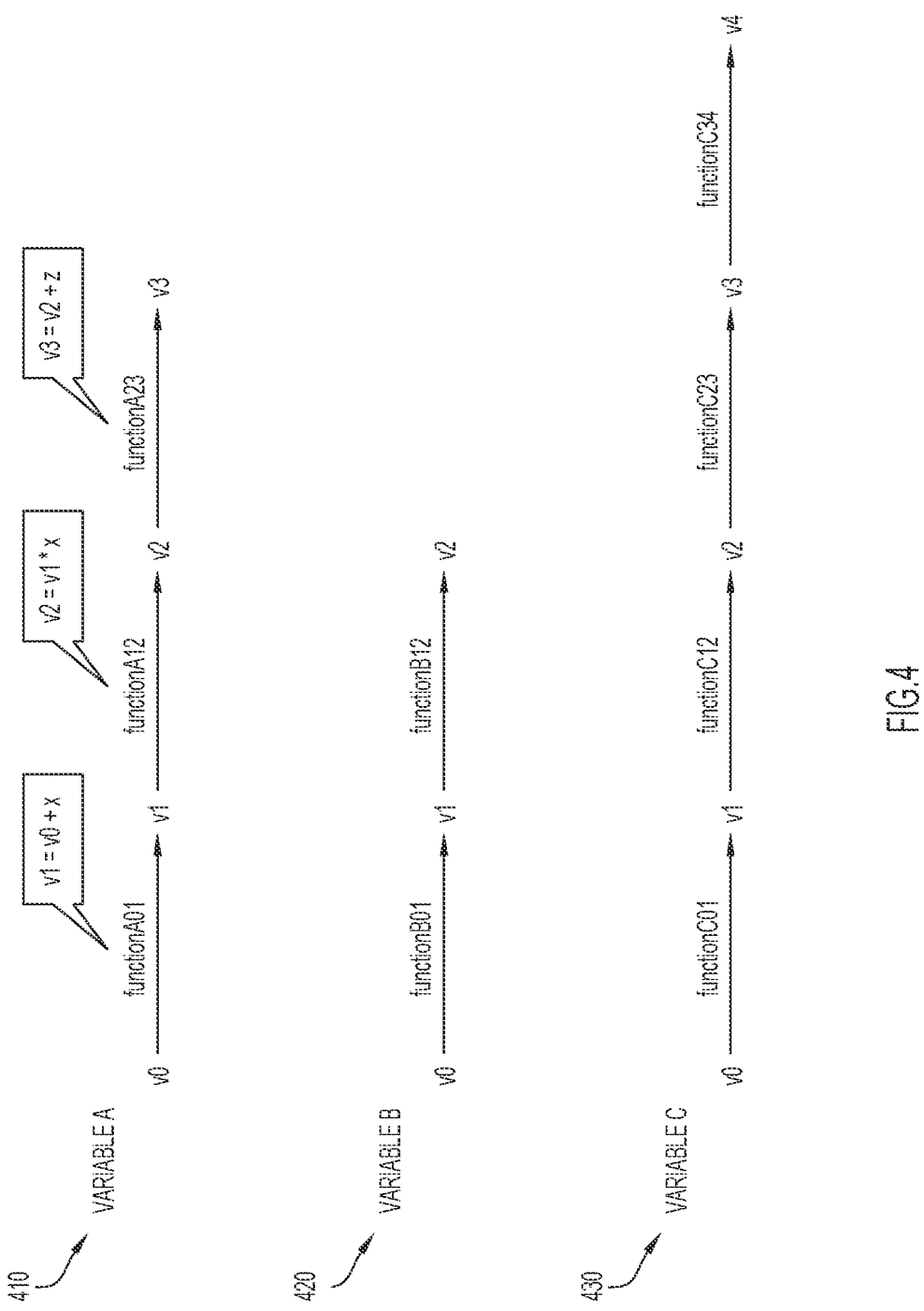
FIG. 4 is a diagrammatic illustration of example variable lifecycle chains according to an embodiment of the present invention.

Security evaluation code 200 generates a lifecycle chain of a problematic variable (e.g., a variable residing within code that is vulnerable or has a potential security issue, etc.) at operation 230. The lifecycle chain is utilized to calculate a final or overall risk factor score based on a flow for the problematic variable through corresponding code. A lifecycle chain for variables is illustrated, by way of example only, in FIG. 4. Initially, a lifecycle chain basically indicates a flow for a variable through corresponding code (or functions). By way of example, a lifecycle chain 410 represents a flow for a variable A. The variable is initially in state v0, and is applied to a function (e.g., functionA01 as viewed in FIG. 4) to produce a second variable or variable state v1 (e.g., functionA01 may correspond to v1=v0+x, where x may represent another variable as shown in FIG. 4). The variable is further applied to another function (e.g., functionA12 as viewed in FIG. 4) and transitions from variable or variable state v1 to variable or variable state v2 (e.g., functionA12 may correspond to v2=v1*xyz, where x, y, an z may represent other variables as shown in FIG. 4). The variable is further applied to another function (e.g., functionA23 as viewed in FIG. 4) and transitions from variable or variable state v2 to variable or variable state v3 (e.g., functionA23 may correspond to v3=v2+z, where z may represent another variable as shown in FIG. 4).

By way of further example, a lifecycle chain 420 represents a flow for a variable B. The variable is initially in state v0, and is applied to a function (e.g., functionB01 as viewed in FIG. 4) to produce a second variable or variable state v1. The variable is further applied to another function (e.g., functionB12 as viewed in FIG. 4) and transitions from variable or variable state v1 to variable or variable state v2.

In still another example, a lifecycle chain 430 represents a flow for a variable C. The variable is initially in state v0, and is applied to a function (e.g., functionC01 as viewed in FIG. 4) to produce a second variable or variable state v1. The variable is further applied to another function (e.g., functionC12 as viewed in FIG. 4) and transitions from variable or variable state v1 to variable or variable state v2. The variable is further applied to yet another function (e.g., functionC23 as viewed in FIG. 4) and transitions from variable or variable state v2 to variable or variable state v3. The variable is further applied to still another function (e.g., functionC34 as viewed in FIG. 4) and transitions from variable or variable state v3 to variable or variable state v4.

A risk factor score and risk weight value may be determined for each stage (e.g., variable/variable state transition or function) of a variable lifecycle chain, where the risk factor score for each stage (e.g., after the initial stage) is based on the risk factor score for a prior stage as described below.

Referring back to FIG. 2, once the variable lifecycle chain is generated, security evaluation code 200 employs an exponential weighted average technique or algorithm to improve the risk factor score accuracy. The lifecycle chain tracks a hierarchical structure of the code, and a final risk factor score is determined by using the exponential weighted average technique. The final risk factor score is based on prior risk factor scores and risk weight values determined by the risk weight machine learning model. This approach considers a depth impact of variables in a lifecycle chain since a variable may be exposed to different potential risks in different portions of a code hierarchy.

Security evaluation code 200 performs an analysis based on the risk factor and risk weight machine learning models and variable lifecycle chain at operation 240 to render a determination with respect to the security issue (associated with the problematic variable) being a valid security issue or a false positive. The determination and corresponding information (e.g., the final risk factor score, function attributes, etc.) is fed back to the risk factor and risk weight machine learning models at operation 245 for continuous re-training to improve results.

A method 500 of analyzing code for security vulnerability based on machine learning models (e.g., via security evaluation code 200 and computer 101, etc.) according to an embodiment of the present invention is illustrated in FIG. 5. Initially, method 500 includes flow 510 for initializing the risk factor and risk weight machine learning models, and a flow 550 for processing security issues in software or code (e.g., on-premise code, distributed or cloud applications, etc.). With respect to flow 510, security evaluation code 200 extracts features of functions from the software or code at operation 515. The features may include a component name, variable name, package name, function name, a function comment, path keywords, and/or other attributes. A function may include any procedure, routine, or any portion or elements of code to perform a desired task or operation.

Security evaluation code 200 determines a semantic similarity of the extracted features for each pair of functions at operation 520. The semantic similarity may be determined using any conventional or other techniques (e.g., cosine similarity, etc.). For example, the function attributes or features of a function A and a function B (in the form of word vectors) are merged with removal of duplicate word vectors (e.g., duplicates between the function attributes are removed). The resulting word vectors of function A and function B represent corresponding documents. The term frequency-inverse document frequency (TF-IDF) value of each word vector of function A and function B are determined to produce values (or a vector) for function A (containing TF-IDF values for word vectors of function A) and function B (containing TF-IDF values for word vectors of function B). TF-IDF may be expressed as:

$$TF = \text{count of a word/total word}$$
$$\text{count (in the word vectors representing a document)};$$
$$IDF = \log\left[(\text{number of documents/}\right.$$
$$\left.((\text{number of documents containing the work}) + 1)\right];$$

and $$TF\text{-}IDF = TF * IDF.$$

The cosine similarity is determined as the semantic similarity for the functions. The cosine similarity may be expressed as:

$$\cos(\theta) = A \cdot B / (\|A\|\|B\|);$$

where A represents the vector of TF-IDF values for function A, B represents the vector of TF-IDF values for function B, the numerator represents the dot product of vectors, and the denominator represents a product of vector magnitudes.

Security evaluation code 200 clusters the functions using machine learning models based on the semantic similarity at operation 525. A risk weight machine learning model may perform cluster analysis using keys including a function name and a problematic variable (e.g., a variable residing within code that is vulnerable or has a potential security issue, etc.) at operation 530 to determine a risk weight value. The risk weight value indicates a risk factor for a function with respect to a problematic variable. Further, a risk factor machine learning model may perform cluster analysis using keys including the function name and all variables at operation 535 to determine a risk factor score. The risk factor score indicates a risk factor for a function with respect to function variables.

The cluster analysis identifies common characteristics in the function attributes, and determines results based on the presence or absence of the characteristics in data for a new function. The cluster analysis may use a K-means type clustering technique, however any conventional or other clustering techniques (e.g., hierarchical clustering, etc.) may be used to cluster the functions.

The machine learning models cluster the functions in a feature space (of function attributes) to form clusters of functions by processing the function features. The formed clusters are each associated with functions from which a corresponding risk weight value or risk factor score may be derived. For example, the clusters may each be associated with a risk weight value or risk factor score, where the clustering identifies the function features associated with the risk weight values and risk factor scores of the clusters. The different keys (e.g., function name, problematic variable, all variables, etc.) may form reference points for forming the clusters. K-means clustering initially uses random central points for clustering. However, an embodiment of the present invention improves accuracy of K-means clustering by utilizing target-oriented initial central points (e.g., central points with features achieving a desired objective, etc.) rather than random central points as described below.

The machine learning models may be implemented by any conventional or other machine learning models (e.g., mathematical/statistical models, classifiers, feed-forward, recurrent or other neural networks, etc.). For example, neural networks may include an input layer, one or more intermediate layers (e.g., including any hidden layers), and an output layer. Each layer includes one or more neurons, where the input layer neurons receive input (e.g., feature vectors), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, a machine learning model may be trained with a training set of features, where the neural network attempts to produce the provided or known data and uses an error from the output (e.g., difference between inputs and outputs) to adjust weight (and bias) values. The output layer of the neural network indicates a cluster for input data. By way of example, the output layer neurons may indicate a specific cluster or an identifier of the specific cluster (and a probability or confidence). Further, output layer neurons may be associated with different clusters and indicate a probability (or confidence) of the input data belonging to the associated cluster. The cluster associated with the highest probability is preferably selected for the input data.

The risk weight and risk factor machine learning models are trained with a history of data from security scans of software or code and the information scan source (e.g., vectors with information from rows of the risk data model, etc.).

By way of example, a function name and problematic variable (e.g., a variable residing within code that is vulnerable or has a potential security issue, etc.) may be used as key values for clustering to determine a risk weight value. The risk weight value indicates a risk factor for a function with respect to a problematic variable. In order to determine or predict a risk weight value, new security issues from a scan report (e.g., (function, variable)) may be used as cluster initial central points by the risk weight machine learning model. The features of the functions (or feature vectors) may include function name, variable names, package name, initialized risk score, and risk weight value for the security finding (from the risk data model), etc.). The semantic similarity between the initial central points and sample points from the history (e.g., from prior security scans, etc.) is determined in substantially the same manner described above, and used to assign each sample point to a nearest initial central point (and corresponding cluster or category). A function closest to a mean of each cluster or category (e.g., a function closest to an average or mean risk weight value) is determined and used as a new central point. The above process (of assigning functions to clusters based on semantic similarity to new central points) is repeated until the central points converge (e.g., the central points do not change beyond a threshold amount, etc.). The clusters include corresponding functions with common or substantially the same characteristics that are used to determine the risk weight value for a new function assigned to a cluster. For example, the risk weight value of items in a corresponding cluster to which a function is assigned (e.g., risk weight value of a cluster central point, risk weight value of a majority of the items in the assigned cluster, average risk weight value of items in the assigned cluster, etc.) serves as the risk weight value for the function/problematic variable, etc.). The risk weight machine learning model may receive a function and problematic variable (and corresponding features) and produce a risk weight value based on the clustering (or characteristics of the assigned cluster).

The risk factor score may be determined by the risk factor machine learning model in substantially the same manner described above using the function name and all variables as keys for the clustering and a function closest to an average risk factor score as the new central point for a cluster. The clusters include corresponding functions with common or substantially the same characteristics that are used to determine the risk factor score and type for a new function assigned to a cluster. For example, a risk weight value and/or initialized risk score of functions in a corresponding cluster to which a function is assigned may be used to determine the risk factor score for the function (e.g., risk weight value and/or initialized risk score of a cluster central point, risk weight value and/or initialized risk score of a majority of the items in the assigned cluster, average risk weight value and/or initialized risk score of items in the assigned cluster, average or otherwise combine the risk weight value and initialized risk score for a cluster central point, for these values indicated by a majority of items in the cluster, for these values indicated by each of the items in the cluster, etc.). Further, functions in the corresponding cluster may have features (from the risk data model) indicating a security issue is a valid issue (or a false positive) which may serve as a categorization of the new security issue. The risk factor machine learning model may receive a function and function variables (and corresponding features) and produce a risk factor value and type or categorization of the security issue (e.g., valid issue or false positive) based on the clustering (or characteristics of the assigned cluster).

With respect to flow 550, security evaluation code 200 accesses a security scan information source generated from various repositories, artifacts, and channels (e.g., security issue comments in a forum or tool, security issue explanations in a forum or tool, file annotations, security scan reports, communications (e.g., communication platform messages, electronic mail, etc.), etc.) to retrieve security information for a new security evaluation at operation 555. The security scan information source may include information from results or reports of various security scans (e.g., dynamic, open-source, security quality assurance (QA), penetration testing, etc.) of software or code (e.g., on premise code, distributed or cloud applications, etc.).

Each security finding in the security information (e.g., code, function, variable, etc. with a security or privacy vulnerability) is assigned an initial risk score at operation 560 (e.g., from the risk data model, common weakness enumeration (CWE) information, etc.). A security issue or finding (e.g., function and corresponding features or attributes) is provided to the risk factor machine learning model at operation 565. The risk factor machine learning model performs clustering to assign the function to a cluster in substantially the same manner described above. When the function is assigned to a cluster with a confidence or match above a threshold value (e.g., a probability or confidence greater than 90%, etc.), the risk factor score produced by the risk factor machine learning model is used as the final risk factor score for determination of a valid security issue. However, any threshold value for confidence or probability may used (e.g., preferably greater than 50%, etc.).

When the function is assigned to a cluster with a confidence or match equal to or below the threshold (e.g., a probability or confidence less than or equal to 90%, etc.), the risk factor score produced by the risk factor machine learning model is used as an initial risk factor score for determining a final risk factor score. In particular, a lifecycle chain is produced for a problematic variable at operation 570, and an exponential weighted average technique is used to improve an accuracy of the risk factor score at operation 575.

Figure 6:
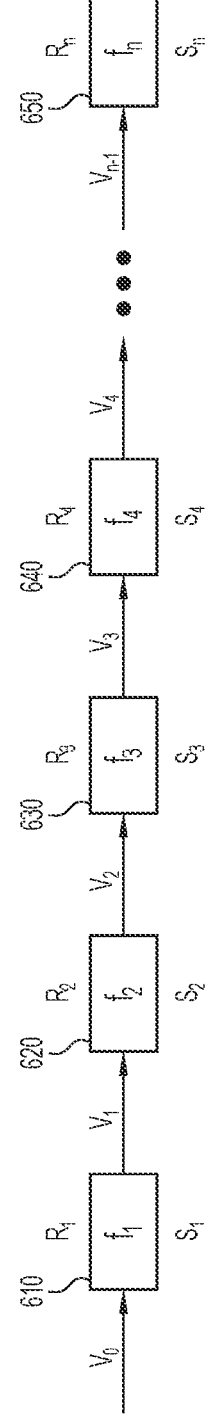
FIG. 6 is a diagrammatic illustration of determining a risk factor score based on a variable lifecycle chain according to an embodiment of the present invention.

Referring to FIG. 6, an example lifecycle chain 600 for a variable is similar to the lifecycle chains described above (e.g., for FIG. 4). Lifecycle chain 600 includes stages 610, 620, 630, 640, and 650 each corresponding to the variable being applied to a function within the code. For example, the variable is initially in state $v_0$, and is applied to a function (e.g., $f_1$ as viewed in FIG. 6) to produce a second variable or variable state $v_1$ at stage 610. The variable is further applied to another function (e.g., $f_2$ as viewed in FIG. 6) and transitions from variable or variable state $v_1$ to variable or variable state $v2$ at stage 620. The variable is further applied to yet another function (e.g., $f_3$ as viewed in FIG. 6) and transitions from variable or variable state $v_2$ to variable or variable state $v_3$ at stage 630. The variable is further applied to still another function (e.g., $f_4$ as viewed in FIG. 6) and transitions from variable or variable state $v_3$ to variable or variable state $v_4$ at stage 640. The chain may include any quantity of stages based on the code until reaching a final stage 650 transitioning from a variable or variable state $v_{n-1}$ based on a function (e.g., $f_n$ as viewed in FIG. 6) at stage 650.

Each stage is associated with a corresponding risk weight value, R, that is used to produce a risk factor score, S, for a next stage. The risk weight value for each stage is determined by the risk weight machine learning model clustering functions based on the function name and variable name at that stage. The risk factor score for a current stage is based on the risk weight value and risk factor score for a prior stage, where the risk factor score, $S_1$, for initial stage 610 is determined by the risk factor machine learning model clustering functions based on the function name and all function variables. The initial risk factor score from the risk factor machine learning model is applied to the exponential weighted average technique to improve accuracy and produce a final or overall risk factor score. For example, $S_1$ may be the result or risk factor score from clustering functions. $S_n$ (n>1) may be expressed as follows:

$$S_2 = S_1 + (1 - \beta)R_1 \text{ for stage 620;}$$

$$S_3 = S_2 + (1 - \beta)R_2 \text{ for stage 630;}$$

$$S_4 = S_3 + (1 - \beta)R_3 \text{ for stage 640;}$$

$$S_n = S_{n-1} + (1 - \beta)R_{n-1} \text{ for stage 650;}$$

where $\beta$ is an adjustable hyperparameter (e.g., $1-1/N$, with $\beta=0.75$ for N=4 functions as shown in FIG. 6).

The risk factor score for subsequent stages beyond the initial stage is the average risk score of a number of prior functions (e.g., average of risk factor scores for $1-1/\beta$ prior functions, etc.). A final or overall risk factor score, $S_{final}$, is the risk factor score of the final stage, $S_n$.

Referring back to FIG. 5, security evaluation code 200 compares the resulting risk factor score (e.g., adjusted by the exponential averaging technique or unadjusted based on the confidence) to the initial risk score (e.g., from operation 560) at operation 580. The security issue (e.g., function and corresponding information including the final risk factor score) may be applied to the risk factor machine learning model to provide an indication of a valid issue or a false positive based on clustering (or type associated with the assigned cluster). When the security issue is a valid issue (e.g., indicated by the risk factor machine learning model, difference between the initial risk score and final risk factor score is within a threshold, etc.), the security issue is reported for resolution at operation 585. The risk factor score may be applied to a legend or scale that indicates a value range for a corresponding severity of the security issue (e.g., as described below for FIGS. 7A-7E). A report may be sent to one or more persons associated with the code portion or security issue, and may include any information (e.g., function name, variable, explanation, risk factor score, severity, valid issue indication, etc.). Alternatively, security evaluation code 200 may automatically resolve the security issue (e.g., modify code, modify parameters, re-compile code, etc.).

When the security issue is a false positive, the security issue is reported as a false positive at operation 590. A report may be sent to one or more persons associated with the code portion or security issue, and may include any information (e.g., function name, variable, explanation, risk factor score, severity, false positive indication, etc.). The determination and corresponding information (e.g., risk factor score, function name, variable, etc.) is fed back to the machine learning models for continuous re-training to improve accuracy. The security issues or findings in the security evaluation may each be processed in substantially the same manner described above to determine or predict valid security issues and/or false positives and severity of the security issues.

Figure 7A:
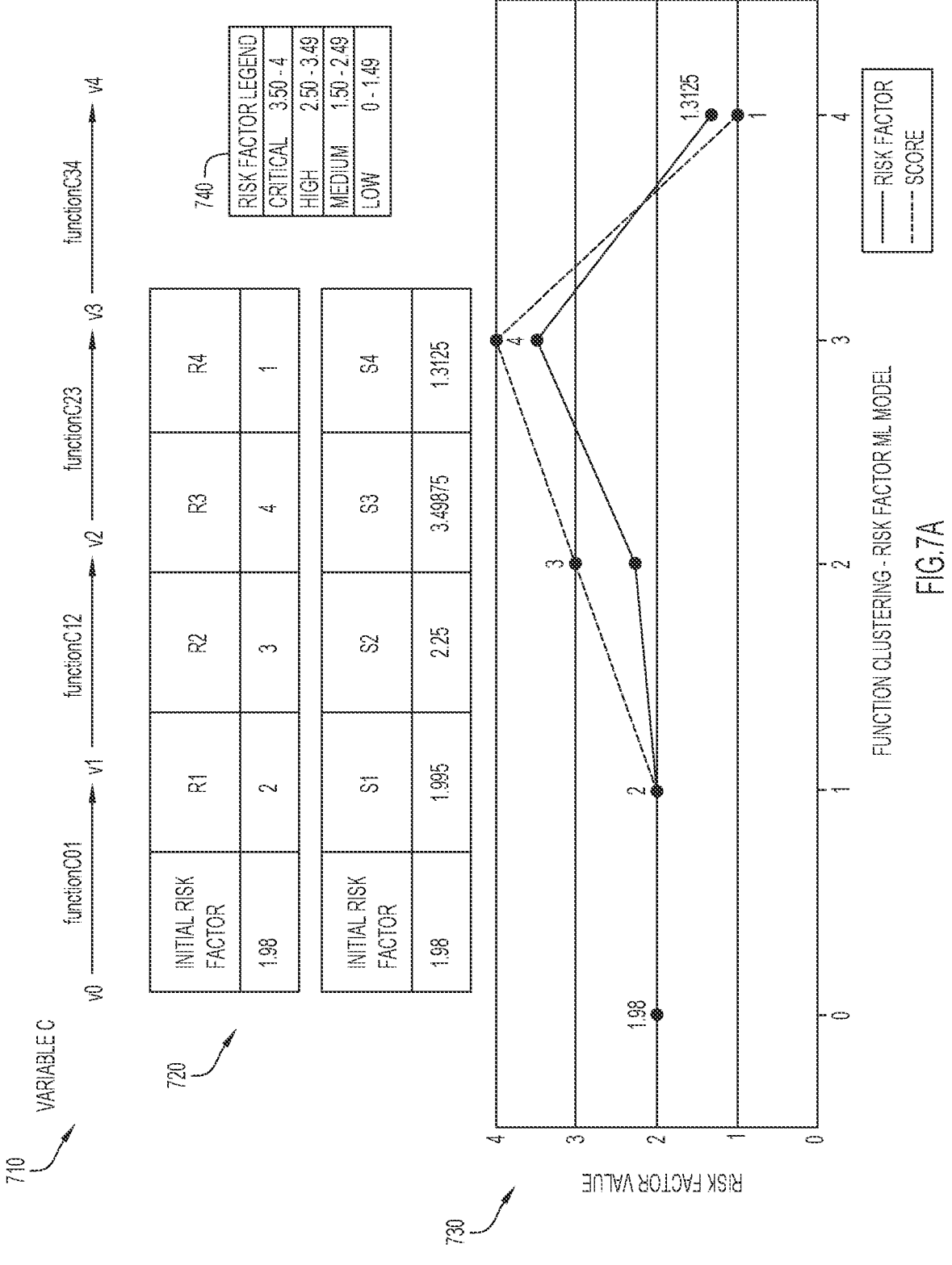
FIGS. 7A-7E illustrate examples of results of security vulnerability analysis by machine learning models in tabular and graphical forms for different scenarios according to an embodiment of the present invention.

Examples of results of security vulnerability analysis in tabular and graphical forms for different scenarios according to an embodiment of the present invention are illustrated in FIGS. 7A-7E. In particular, FIG. 7A illustrates an example lifecycle chain 710 for a variable (e.g., variable C as shown in FIG. 7A). Lifecycle chain 710 is substantially similar to lifecycle chain 430 described above, and includes variable or variable state v0 transitioning to variable or variable states v1, v2, v3, and v4 via corresponding functions (e.g., functionC01 functionC12, functionC23, and functionC34 as shown in FIG. 7A). A table 720 indicates values for the initialized risk score (e.g., from the risk data model), risk weight values, R, and risk factor scores, S, for each stage/function of the lifecycle chain. Further, a graph 730 includes an X axis for the stage/function and a Y axis for a value range, and plots the R and S values along these axes. The R value is localized to the specific stage (e.g., specific function and variable), while the S value considers the variable history. A legend or key 740 indicates value ranges for a corresponding severity level of the security issue (e.g., a value in the range of 3.50-4.00 may indicate critical severity, a value in the range of 2.50-3.49 may indicate high severity, a value in the range of 1.50-2.49 may indicate medium severity, and a value in the range of 0.00-1.49 may indicate low severity). However, any value ranges may be used to indicate any severity levels. The information indicates that although the third stage is associated with a risk weight value indicating a critical level, the overall severity (and risk factor score) remains low due to consideration of lower severity in the variable history.

Figure 7B:
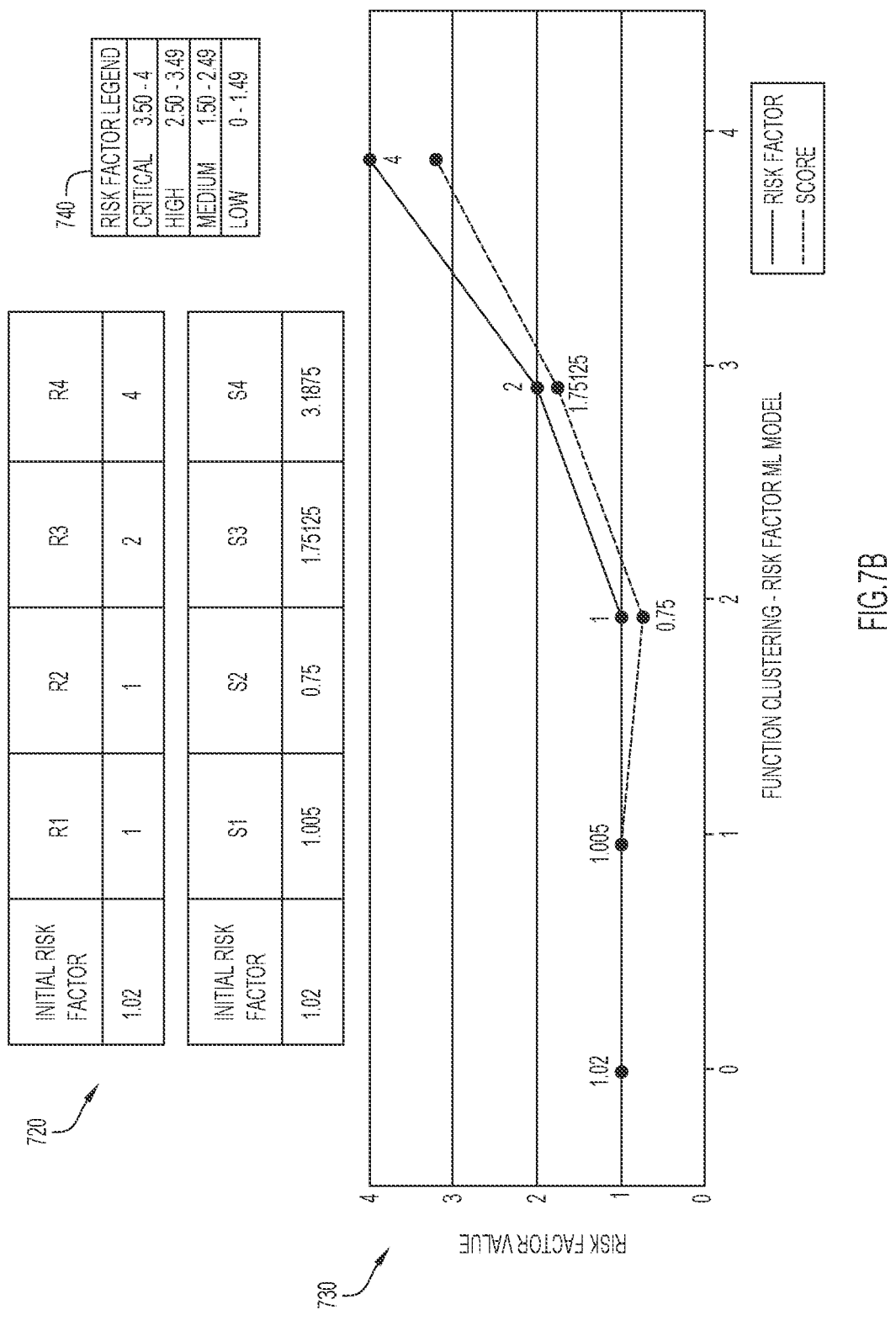

FIG. 7B illustrates a scenario where the severity of the security issue increases through the lifecycle chain. The information indicates that although the initial stages are associated with a risk weight value indicating low to medium severity, the overall severity (and risk factor score) remains high due to consideration of higher severity in the variable history.

Figure 7C:
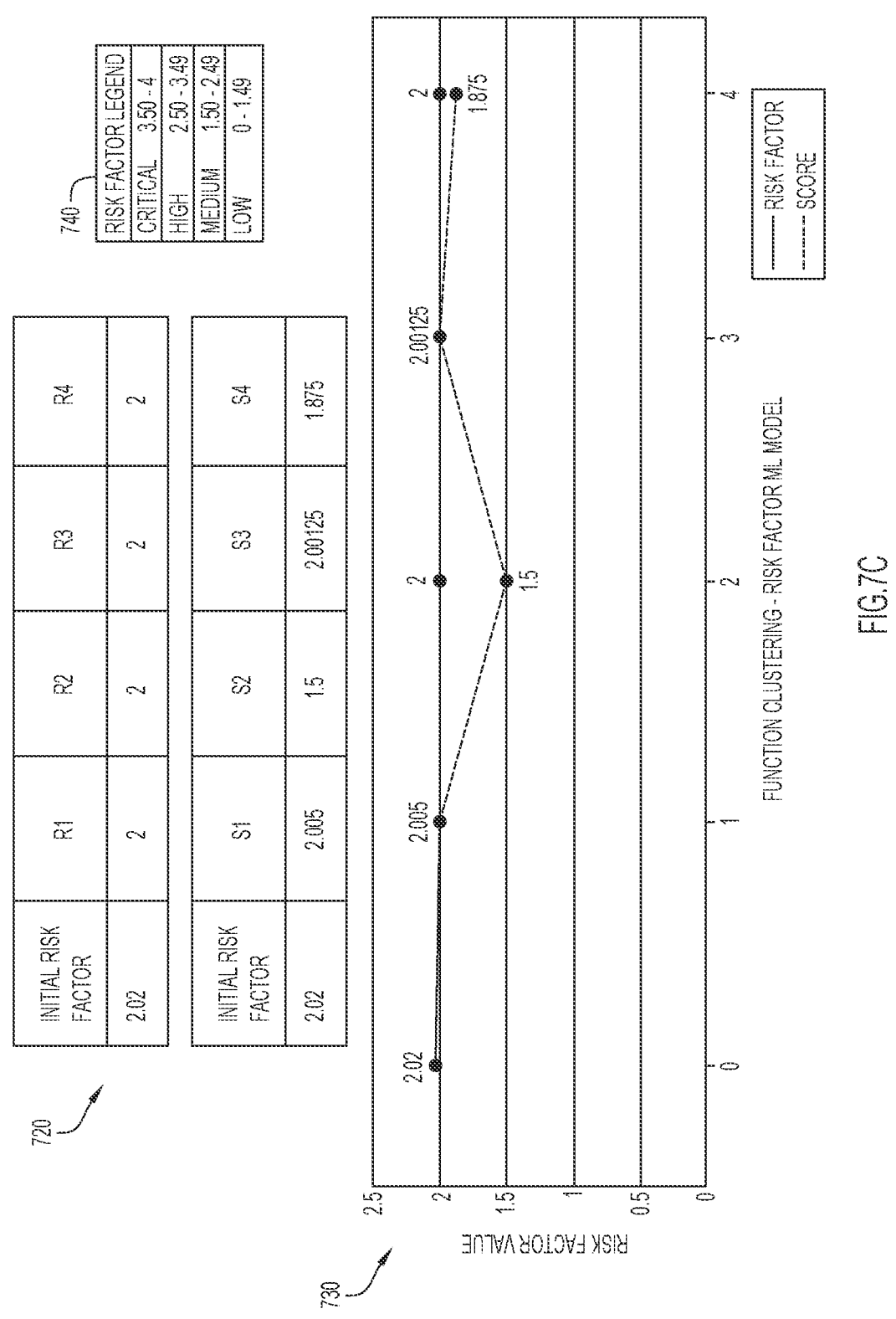

FIG. 7C illustrates a scenario where the severity of the security issue remains relatively the same. A decrease in the risk factor score occurs for functionC12 due to consideration of other factors in the variable history. The overall severity (and risk factor score) remains medium due to the variable history.

Figure 7D:
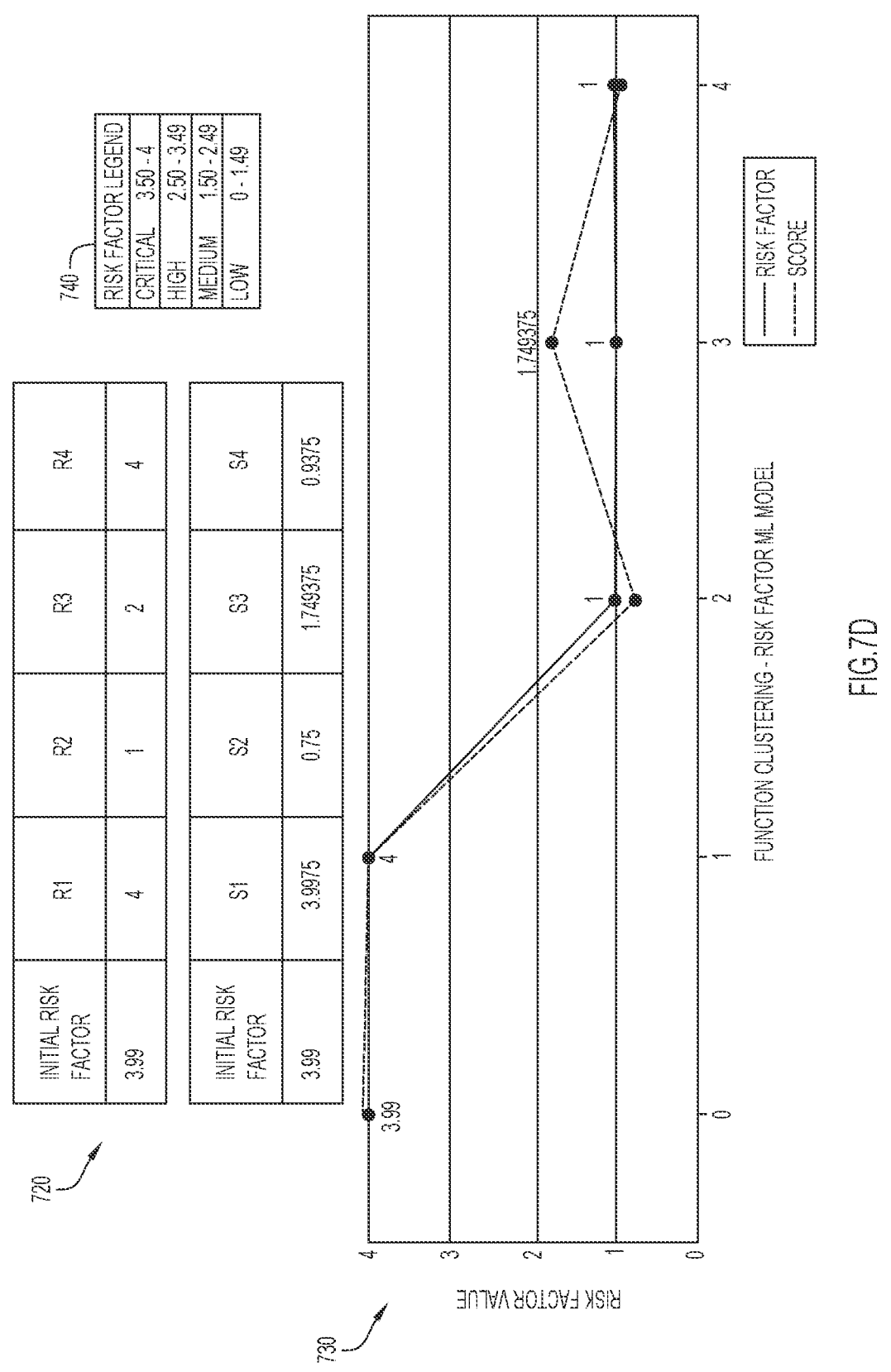

FIG. 7D illustrates a scenario where the severity of the security issue decreases between functionC12 and functionC23, and flattens toward functionC34. The information indicates that although the initial stage is associated with a risk weight value indicating a critical level, the overall severity (and risk factor score) remains low due to consideration of lower severity in the variable history.

Figure 7E:
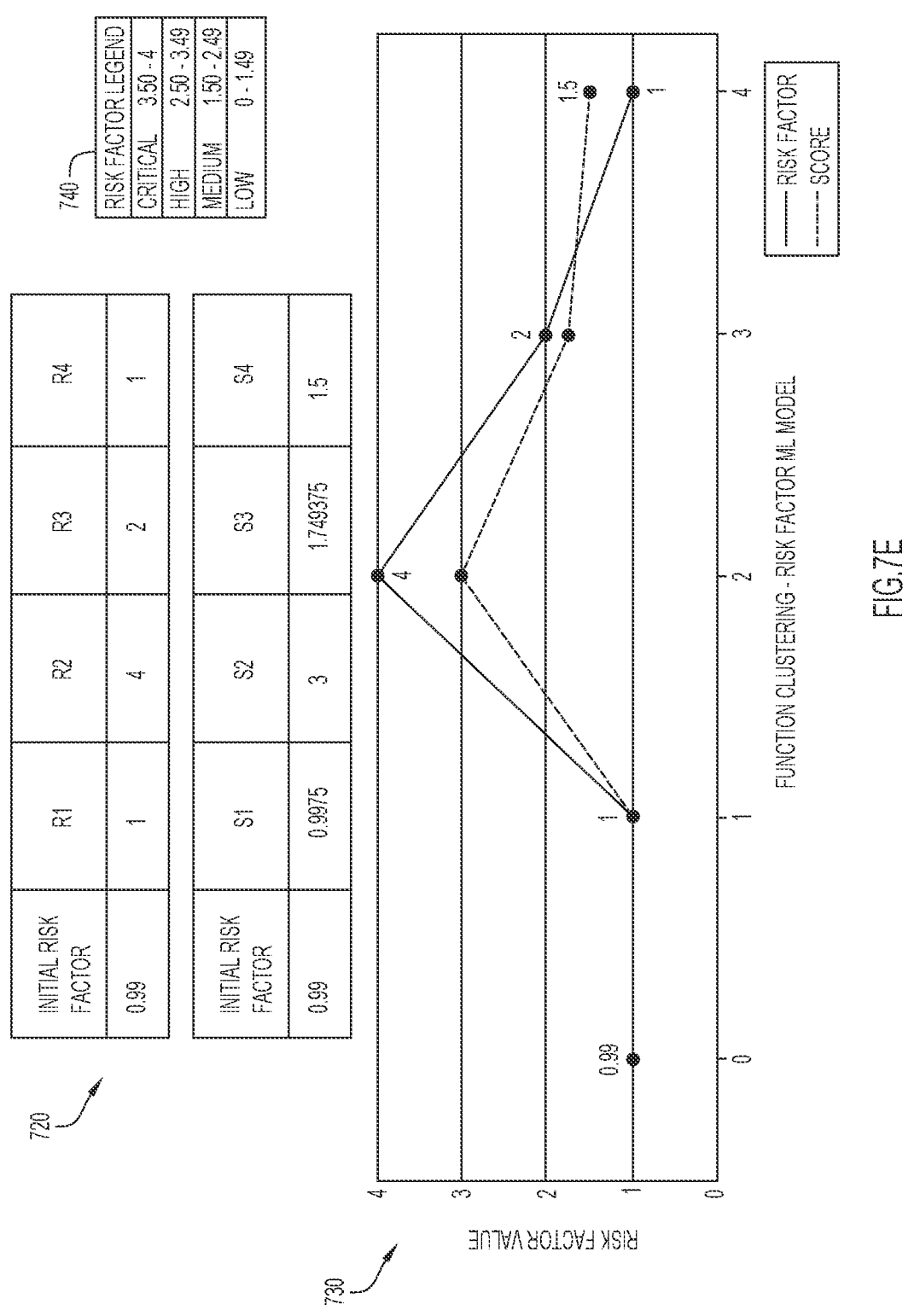

FIG. 7E illustrates a scenario where the severity of the security issue increases and subsequently decreases. The information indicates that although the second stage is associated with a risk weight value indicating a critical level, the overall severity (and risk factor score) remains medium due to consideration of lower severity in the variable history.

Present invention embodiments may provide various technical and other advantages. In an embodiment, the machine learning models may be continuously updated (or trained) based on user feedback, new security scan information, and/or determinations/predictions of the machine learning models. For example, user feedback (e.g., overrides, corrections, etc.), new security scan information, and/or determinations/predictions may indicate more preferable determinations for security issues for a user. This information may be used to update or train the machine learning models with new or different training data (e.g., derived from attributes of the information, etc.) to enable determination of security issues with greater accuracy and closer to user preferences (e.g., the machine learning models may be updated with respect to determination of valid security issues or false positives, etc.). Thus, the machine learning models may continuously evolve (or be trained) to learn characteristics of valid issues, false positives, and a specific user and/or improve accuracy or relevancy to the user.

It will be appreciated that the embodiments described above and illustrated in the drawings represent only a few of the many ways of implementing embodiments for security vulnerability analysis of code based on machine learning and variable usage.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system. These systems may include any types of monitors and input devices (e.g., keyboard, mouse, voice recognition, etc.) to enter and/or view information.

It is to be understood that the software of the present invention embodiments (e.g., security evaluation code 200, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardware, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., security issues, determinations, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

A report may include any information arranged in any fashion, and may be configurable based on rules or other criteria to provide desired information to a user (e.g., security findings, code, determinations and/or predictions, etc.).

The present invention embodiments are not limited to the specific tasks or algorithms described above, but may be utilized for analyzing security issues of any type of software based on any security and/or code information (e.g., variable lifecycle, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of analyzing software for security vulnerabilities comprising:

analyzing, via at least one processor, information from a security scan of code to identify a security issue pertaining to a code portion;

determining, via a machine learning model of the at least one processor and at a current stage of a lifecycle chain corresponding to a variable associated with the security issue, an initial risk factor score for an operation applied to the variable, wherein the initial risk factor score is determined based at least in part on a risk weight value corresponding to a previous stage of the lifecycle chain, a clustering analysis and a history of information pertaining to one or more prior security scans, wherein the machine learning model performs the clustering analysis using names of code portions and variables associated with security issues identified in the code from the security scan as central points for clustering;

refining, via the at least one processor, the initial risk factor score to produce an overall risk factor score for the security issue based on a confidence of the initial risk factor score, wherein the initial risk factor score is refined based on one or more risk factor scores for operations within the code applied to a variable of the code portion; and determining, via the at least one processor, a classification of the security issue as one of a valid security issue and a false positive based on the overall risk factor score.

2. The method of claim 1, further comprising:

determining, via a second machine learning model of the at least one processor and at the current stage of the lifecycle chain, a risk weight value for the operation applied to the variable.

3. The method of claim 2, wherein the second machine learning model performs clustering based on a name of the code portion and each variable of the code portion.

4. The method of claim 1, wherein the initial risk factor score serves as the overall risk factor score in response to the confidence satisfying a threshold.

5. The method of claim 1, further comprising: re-training the machine learning model, via the at least one processor, based on the classification and overall risk factor score for the security issue.

6. The method of claim 1, further comprising: obtaining the overall risk factor score by applying an exponential weighted average technique to the initial risk factor score and prior risk factor scores generated by the machine learning model.

7. The method of claim 1, further comprising: utilizing a lifecycle chain of a problematic variable to calculate the overall risk factor score based on a flow of the problematic variable through corresponding code.

8. A system for analyzing software for security vulnerabilities comprising:

one or more processors; and one or more memory devices coupled to the one or more processors, wherein the one or more processors are configured to:

analyze information from a security scan of code to identify a security issue pertaining to a code portion;

determine, via a machine learning model and at a current stage of a lifecycle chain corresponding to a variable associated with the security issue, an initial risk factor score for an operation applied to the variable, wherein the initial risk factor score is determined based at least in part on a risk weight value corresponding to a previous stage of the lifecycle chain, a clustering analysis and a history of information pertaining to one or more prior security scans, wherein the machine learning model performs clustering using names of code portions and variables associated with security issues identified in the code from the security scan as central points for the clustering;

refine the initial risk factor score to produce an overall risk factor score for the security issue based on a confidence of the initial risk factor score, wherein the initial risk factor score is refined based on one or more risk factor scores for operations within the code applied to a variable of the code portion; and determine a classification of the security issue as one of a valid security issue and a false positive based on the overall risk factor score.

9. The system of claim 8, wherein the one or more processors are further configured to:

determine, via a second machine learning model and at the current stage of the lifecycle chain, a risk weight value for the operation applied to the variable.

10. The system of claim 9, wherein the second machine learning model performs clustering based on a name of the code portion and each variable of the code portion.

11. The system of claim 8, wherein the initial risk factor score serves as the overall risk factor score in response to the confidence satisfying a threshold.

12. The system of claim 8, wherein the one or more processors are further configured to:

re-train the machine learning model based on the classification and overall risk factor score for the security issue.

13. The system of claim 8, wherein the one or more processors are further configured to:

obtain the overall risk factor score by applying an exponential weighted average technique to the initial risk factor score and prior risk factor scores generated by the machine learning model.

14. A non-transitory computer-readable medium storing a set of instructions for wireless communication, the set of instructions comprising:

one or more instructions that, when executed by one or more processors of a device, cause the device to:

analyze information from a security scan of code to identify a security issue pertaining to a code portion;

determine, via a machine learning model and at a current stage of a lifecycle chain corresponding to a variable associated with the security issue, an initial risk factor score for an operation applied to the variable, wherein the initial risk factor score is determined based at least in part on a risk weight value corresponding to a previous stage of the lifecycle chain, a clustering analysis and a history of information pertaining to one or more prior security scans, wherein the machine learning model performs clustering using names of code portions and variables associated with security issues identified in the code from the security scan as central points for the clustering;

refine the initial risk factor score to produce an overall risk factor score for the security issue based on a confidence of the initial risk factor score, wherein the initial risk factor score is refined based on one or more risk factor scores for operations within the code applied to a variable of the code portion; and determine a classification of the security issue as one of a valid security issue and a false positive based on the overall risk factor score.

15. The non-transitory computer-readable medium of claim 14, wherein the one or more instructions cause the device to:

determine, via a second machine learning model and at the current stage of the lifecycle chain, a risk weight value for the operation applied to the variable.

16. The non-transitory computer-readable medium of claim 15, wherein the second machine learning model performs clustering based on a name of the code portion and each variable of the code portion.

17. The non-transitory computer-readable medium of claim 14, wherein the initial risk factor score serves as the overall risk factor score in response to the confidence satisfying a threshold.

18. The non-transitory computer-readable medium of claim 14, wherein the one or more instruction cause the device to:

re-train the machine learning model based on the classification and overall risk factor score for the security issue.

19. The non-transitory computer-readable medium of claim 14, wherein the one or more instructions cause the device to:

obtain the overall risk factor score by applying an exponential weighted average technique to the initial risk factor score and prior risk factor scores generated by the machine learning model.

20. The non-transitory computer-readable medium of claim 14, wherein the one or more instructions cause the device to:

utilize a lifecycle chain of a problematic variable to calculate the overall risk factor score based on a flow of the problematic variable through corresponding code.

* * * * *